US008895090B2

(12) United States Patent
Mahlich

(10) Patent No.: US 8,895,090 B2
(45) Date of Patent: Nov. 25, 2014

(54) PORTION CAPSULE AND METHOD FOR PRODUCING THE SAME

(75) Inventor: Gotthard Mahlich, Kronberg (DE)

(73) Assignee: K-Fee System GmbH, Bergisch Gladbach (DE)

( * ) Notice: Subject to any disclaimer, the term of this patent is extended or adjusted under 35 U.S.C. 154(b) by 157 days.

(21) Appl. No.: 13/237,343

(22) Filed: Sep. 20, 2011

(65) Prior Publication Data

US 2012/0070543 A1 Mar. 22, 2012

Related U.S. Application Data

(63) Continuation-in-part of application No. 13/044,217, filed on Mar. 9, 2011.

(30) Foreign Application Priority Data

Sep. 22, 2010 (DE) .................... 20 2010 013 500 U
Feb. 7, 2011 (DE) .......................... 10 2011 010 589
Mar. 2, 2011 (DE) .......................... 10 2011 012 881

(51) Int. Cl.
*B65B 29/02* (2006.01)
*A23F 5/26* (2006.01)
*B65D 85/804* (2006.01)

(52) U.S. Cl.
CPC ................................. *B65D 85/8043* (2013.01)
USPC ............ 426/77; 426/106; 426/122; 426/123; 426/431; 426/433; 426/435

(58) Field of Classification Search
CPC ............ B65D 85/8043; B65D 85/8046; A47J 31/0668; A47J 31/0657; A47J 31/0663; A47J 31/407; A47J 31/3623; A47J 31/06; B01D 2313/44; B01D 39/1623; B01D 63/061
USPC ............ 426/77, 106, 122, 123, 431, 433, 435
See application file for complete search history.

(56) References Cited

U.S. PATENT DOCUMENTS

| 2,778,739 | A |  | 1/1957 | Rodth |
| 4,158,329 | A | * | 6/1979 | McKnight ........................ 99/295 |
| 4,860,645 | A | * | 8/1989 | van der Lijn et al. ........... 99/295 |
| 4,921,712 | A |  | 5/1990 | Malmquist |
| 4,995,310 | A | * | 2/1991 | van der Lijn et al. ........... 99/295 |
| 5,325,765 | A |  | 7/1994 | Sylvan et al. |
| 5,352,765 | A |  | 10/1994 | Drent et al. |
| 7,543,527 | B2 | * | 6/2009 | Schmed .......................... 99/295 |
| 7,910,145 | B2 |  | 3/2011 | Reati |
| 8,425,964 | B2 | * | 4/2013 | Doglioni Majer ............ 426/433 |

(Continued)

FOREIGN PATENT DOCUMENTS

EP 0512468 A1 11/1992
EP 0493856 A2 12/1992

(Continued)

*Primary Examiner* — Anthony Weier
(74) *Attorney, Agent, or Firm* — McNees Wallace & Nurick LLC

(57) ABSTRACT

A portion capsule for producing a beverage is proposed, having a capsule body with a capsule base and a filling side, with a cavity for accommodating a pulverulent or liquid beverage base being formed between the capsule base and the filling side, with a filter element being arranged between the beverage base and the capsule base, and with the filter element having a non-woven which is arranged in the region of the capsule base.

27 Claims, 4 Drawing Sheets

(56) References Cited

U.S. PATENT DOCUMENTS

| | | |
|---|---|---|
| 2003/0172813 A1 | 9/2003 | Schifferle |
| 2007/0148290 A1* | 6/2007 | Ternite et al. .................. 426/90 |
| 2009/0199518 A1* | 8/2009 | Deuber et al. .................. 53/492 |
| 2009/0211458 A1* | 8/2009 | Denisart et al. ................ 99/300 |
| 2011/0064852 A1* | 3/2011 | Mann ............................. 426/78 |
| 2011/0097450 A1* | 4/2011 | Kruger ........................... 426/77 |
| 2011/0142996 A1* | 6/2011 | Kruger ........................... 426/80 |
| 2013/0243910 A1* | 9/2013 | Kruger et al. ................. 426/115 |
| 2014/0017359 A1* | 1/2014 | Kruger et al. .................. 426/78 |

FOREIGN PATENT DOCUMENTS

| | | |
|---|---|---|
| EP | 0521510 A1 | 1/1993 |
| EP | 0554469 A1 | 8/1993 |
| EP | 1344722 A1 | 9/2003 |
| EP | 1710173 A1 | 10/2006 |
| EP | 1792850 B1 | 6/2007 |
| EP | 1997748 * | 12/2008 |
| WO | WO 03/073896 * | 9/2003 |
| WO | 2005/066040 A2 | 7/2005 |

\* cited by examiner

PORTION CAPSULE AND METHOD FOR PRODUCING THE SAME

BACKGROUND

The present invention relates to a portion capsule for producing a beverage, having a capsule body with a capsule base and a filling side, with a cavity for accommodating a pulverulent or liquid beverage base being formed between the capsule base and the filling side, and with a filter element being arranged between the beverage base and the capsule base.

Portion capsules of this kind are generally known from the prior art. By way of example, documents EP 1792850 B1, EP 1344722 A1 and US 2003/0172813 A1 disclose portion capsules of this generic type for preparing coffee and espresso.

Portion capsules of this kind for producing a beverage are preferably in the form of a truncated cone or cylinder and are produced, for example, from a thermoformed plastic film or using a plastic injection molding process. Said portion capsules usually have an open filling side with a collar edge onto which a cover film or foil is sealed or adhesively bonded, a closed capsule base, with a particle screen which is supported against the capsule base being arranged between the beverage base and the capsule base. These screens are either injection molded from a thermoplastic or are thermoformed or stamped from a plastic film.

For the purpose of preparing a coffee beverage, the portion capsule is inserted into a brewing chamber of a preparation appliance. After or during the closing process of the brewing chamber, the capsule is preferably opened on its closed base side by means of an opening mandrel which is arranged in the brewing chamber and, after the brewing chamber is sealed off, the filling side of the portion capsule, which filling side is sealed off by a sealing film or foil, is tapped by means of a puncturing means. Preparation liquid, preferably hot water, is then delivered into the portion capsule under pressure. The preparation liquid flows through the beverage base and extracts and/or dissolves the substances, which are required for producing the beverage, from the beverage base. For the purpose of preparing an espresso, for example a brewing water pressure of up to 20 bar acts on the coffee powder for the purpose of extracting the essential oils. This pressure also acts on the particle screen which is situated between the coffee powder and the capsule base and in front of the punctured capsule outlet.

A disadvantage of the screens which are produced using a plastic injection molding process or using a thermoforming or stamping process is, however, that the openings in the screen holes have to be smaller than the smallest coffee particles in order to retain the coffee particles. Since a certain proportion of dust is necessarily produced in a coffee grinding process, coffee particles pass through if the screen holes are too big or the screens are blocked if the screen holes are too small, in particular at high pressures. Furthermore, corresponding supporting elements which act against the capsule base are required beneath the screens in order to absorb the brewing water pressures of up to 20 bar and to prevent deformation of the screens as a result of the high brewing water pressure (together with a high brewing water temperature). These supporting elements disadvantageously require additional material to be used, particularly in the case of screen arrangements produced using an injection molding process, as a result of which the production costs rise.

Therefore, the prior art discloses portion capsules with screen arrangements which are intended to avoid these disadvantages. U.S. Pat. No. 2,778,739, EP 1710173 A1 and U.S. Pat. No. 5,325,765 disclose portion capsules having screen arrangements which consist of a screen support with relatively large passage openings, with these openings being covered by a filter material. A disadvantage of these arrangements is that additional costs for material and manufacture are incurred for forming such screen arrangements since they consist of a stable screen support and the filter material which is arranged on the screen support.

Both in the case of screens with screen holes and in the case of screen arrangements with an additional filter material, it is necessary to ensure that the ready beverage which passes through the screen arrangement can flow to a capsule outflow opening, that is to say a free space for the discharge of a beverage has to be provided between the capsule base and the screen arrangement. In addition, screen arrangements of this kind take up their own proportion of space in the portion capsule, this leading to an increase in the volume of the capsule and thus necessarily likewise to additional material being used.

The object of the present invention was therefore to provide a portion capsule having a filter arrangement, which portion capsule is less expensive to manufacture in comparison to the prior art and in which the disadvantages described in connection with the prior art are avoided at the same time.

SUMMARY

This object is achieved by a portion capsule for producing a beverage, having a capsule body with a capsule base and a filling side, with a cavity for accommodating a pulverulent or liquid beverage base being formed between the capsule base and the filling side, with a filter element being arranged between the beverage base and the capsule base, and with the filter element comprising a non-woven which is arranged in the region of the capsule base.

In comparison to the prior art, the portion capsule according to the invention has the advantage that a simple and cost-effective filter non-woven is used as the filter screen. A complicated plastic injection molding process or a thermoforming or stamping process for producing the screens can therefore be saved. The production costs are therefore considerably lowered. In addition, a supporting structure is not required since the non-woven is supported directly on the capsule base. In addition, a filter non-woven has the advantage over the plastic filters known from the prior art that it has a considerably larger liquid inlet surface. Furthermore, transverse flow of liquid (parallel to the plane of main extent of the filter plane) is made possible, as a result of which improved mixing and outflow behavior is achieved. It has also been found that the risk of the screens becoming blocked is considerably reduced or virtually eliminated when a filter non-woven is used. Surprisingly, the filter non-woven has proven to be resistant to blockage both in the case of a beverage preparation with a preparation liquid which is under a comparatively low pressure and in the case of a beverage preparation with a preparation liquid which is under a comparatively high pressure. Furthermore, a transverse flow of liquid in the filter non-woven is always reliably maintained and outflow of the liquids entering the filter non-woven to an outflow opening is always reliably ensured. In spite of this, a so-called "crema", that is to say foam, forms on the beverage, in particular the espresso. The portion capsule within the meaning of the present invention comprises a preferably hermetically sealed portion capsule. This means that the beverage or food product powder, for example coffee powder, soup powder or tea, located in the portion capsule is sealed off from the environment in a substantially aroma-tight manner before the extraction process. However, the portion capsule does not have to be hermetically sealed, but rather can also be provided in a hermetically sealed package prior to use, said package then being opened, for example manually.

A non-woven within the meaning of the invention is an unordered, non-woven structure comprising fibers, in particular plastic fibers. A non-woven within the meaning of the invention preferably does not contain any paper or paper-like materials.

According to a further embodiment of the present invention, provision is made for the non-woven to comprise a non-woven material which is produced from fine plastic fibers, for example fine polyester fibers, and, in particular, is a random fiber non-woven and/or a fiber-oriented non-woven. The non-woven preferably has a mass per unit area (also called the grammage or the basis weight) of between 40 and 100 grams per square meter, particularly preferably of between 60 and grams per square meter, and very particularly preferably of substantially 70 grams per square meter. The filter element or the non-woven preferably has a thickness of between 0.2 and 0.8 millimeters, particularly preferably of between 0.3 and 0.35 millimeters, and very particularly preferably of substantially 0.32 millimeters. The non-woven is formed in such a way that air permeability of the non-woven is preferably between 1000 and 3000 $1/(m^2s)$, particularly preferably between 1500 and 2500 $1/(m^2s)$, and very particularly preferably substantially 2000 $1/(m^2s)$ at a pressure of 100 pascal. It has surprisingly and unforeseeably been found that optimum results in terms of extraction efficiency, mixing and outflow behavior and also blockage resistance can be achieved with non-wovens of this kind and that the "crema" is formed in spite of this.

The non-woven is preferably arranged on the base of the capsule such that it rests on as large a surface area as possible. The non-woven is particularly preferably sealed to the base, in particular by ultrasound. The non-woven is further preferably stretched before it is attached to the capsule, in particular to the capsule base, in order to improve the abutment against the base.

When the capsule is opened by a perforation means, it is advantageous if this perforation means moves the non-woven away from the capsule base and thus stretches or additionally stretches said non-woven. In this case, the perforation means can enter or penetrate the non-woven. The non-woven is preferably larger than the capsule base on which it rests, so that the non-woven protrudes to some extent at the edge.

According to a further subject matter or a further embodiment of the present invention, the filter element has a felt structure. Said felt structure is, in particular, a needle felt structure. The filter element preferably consists of at least one felt structure and a support structure, in particular a woven structure, with the felt structure, at least a subsection of the volume, particularly preferably comprising the support structure. The felt structure preferably extends over the entire cross section of the support structure, but particularly preferably only over a subregion of the height. The felt structure is preferably connected to the support structure in an interlocking, force-fitting and/or cohesive manner. The filter element preferably has two or more felt structures which are preferably separated from one another by the support structure. The thickness of the two felt structures can be the same or different. A felt structure which faces the powder or tea is preferably thinner than the felt structure which faces the capsule base, or vice versa. The surface of the felt structure is preferably treated, for example thermally treated, in order to fix, for example, loose fibers. The filter element which has a felt structure is preferably only inserted into the capsule, in particular onto the base thereof. However, the filter element can also be connected to the capsule, in particular to the base thereof, in particular in a cohesive manner. During perforation, the perforation means can enter this filter element. A plurality of filter elements, which have one or more felt structures and a support structure, are preferably arranged one above the other in the capsule, possibly in a manner connected to one another.

A filter element with a felt structure has the advantage that no "crema" is formed on a coffee, espresso or the like, and that no bubbles are formed on a tea.

A filter element which has a support structure, in particular a woven structure, and a felt structure is produced, for example, by a woven structure comprising longitudinal and transverse threads being provided. In order to construct a felt, in particular a needle felt, fiber units of 0.8-7 dtex are preferably selected. The individual fibers are connected to one another to form a felt and/or are anchored in the support structure preferably by the needling production process. In this case, needles with inverse barbs are inserted into and pulled out of the prelaid fiber packet at high speed. On account of the inverse barbs, the fibers are interwoven with one another and/or with the support woven by means of a large number of loops which are produced.

The support element having one or more felt structures preferably has a mass per unit area (also called the grammage or the basis weight) of between 100 and 800 grams per square meter, particularly preferably of between 200 and 650 grams per square meter, and very particularly preferably of substantially 150-250 grams per square meter for producing tea and 600-700 grams per square meter for producing coffee, espresso or the like. The filter element or the non-woven preferably has a thickness of between 0.8 and 3.3 millimeters, particularly preferably of between 1.1 and 3.0 millimeters, and very particularly preferably of 1.2-1.4 millimeters for producing tea and 2.6-3.0 for producing coffee.

According to a further subject matter or a further embodiment of the present invention, provision is made for the filter element to comprise an open-pore sponge and/or an open-pore foam which is arranged in the region of the capsule base. It has been surprisingly and unforeseeably found that the abovementioned advantages over the prior art, for example the lower production costs, the resistance to blockage, the transverse flow of liquid and also the improved mixing and outflow behavior, can be achieved in the same way with a filter element which is in the form of an open-pore sponge and/or a filter element which is in the form of an open-pore foam. In particular, the non-woven, the open-pore sponge and the open-pore foam each have a microporosity which allows the transverse flow of liquid and therefore makes resistance to blockage possible. The sponge comprises, for example, a reticulated polyurethane foam.

The filter element, that is to say, for example, the non-woven, the felt, the sponge or the foam, is preferably simply inserted into the capsule body and then either rests loosely on the capsule base or is connected to said capsule base and/or to the side wall of the capsule, in particular by welding, for example using ultrasound, before the capsule body is filled with the beverage base. The capsule body is preferably in the form of a truncated cone or cylinder and is, for example, produced from plastic, a natural material and/or a biologically degradable material comprising a thermoformed plastic film or using a plastic injection molding process. The capsule body preferably has, on the filling side, a collar edge onto which a cover film or foil is sealed or adhesively bonded. As an alternative, it is feasible for the capsule body and a capsule cover to be connected to one another by means of a mechanical method. The base of the portion capsule is preferably closed and is preferably first perforated in the brewing chamber by means of a perforation means for producing an outflow opening, said perforation means acting on the portion capsule base from the outside. However, another feasible alternative would be for the base of the portion capsule to already be provided with an outlet opening at the factory, said outlet opening preferably being sealed off by means of a sealing film or foil. The sealing film or foil can be perforated, for example, by means of the perforation means or can be pulled off from the capsule base by hand. The filter non-woven is preferably tear-resistant. The sealing film or foil is preferably a plastic film which has at least one barrier layer, for example a metal layer, in particular an aluminum layer. The plastic film preferably has a "peel-off layer" on its side which faces the capsule, in order to be able to remove the plastic film from the capsule base with comparative ease.

The outlet opening is preferably provided in such a size that it can accommodate a perforation means, which may be present, in a contact-free manner. The outlet opening is particularly preferably provided in such a size that it exhibits no appreciable pressure loss when the ready beverage flows out, in particular that there is no appreciable swirling of the ready beverage, which could lead to air entering the beverage and therefore to the formation of foam.

According to a further subject matter or a further embodiment of the present invention, provision is made for the filter element to be elastic and to be arranged and/or attached, at least in its edge region, in the region of the capsule base. When the capsule base is pierced by an external perforation means, the filter element can, when contact is made with the perforation means, yield or be stretched, on account of its elasticity, in such a way that perforation of the filter element is prevented. This eliminates the risk of the filter element being perforated by the perforation means and beverage substance being washed out of the portion capsule without being filtered. A fixed spacing between the filter element and the capsule base, as is known from the prior art, is not necessary since this distance is automatically created by the perforation means. Furthermore, a collection tank for the beverage liquid which passes through the filter element is produced beneath the filter element in this way.

According to a further subject matter or a further embodiment of the present invention, provision is made for the filter element to be stretched, tapped and/or pierced by the perforation means.

According to a further subject matter or a further embodiment of the present invention, provision is made for the filter element to be arranged in the cavity in the portion capsule and to rest on a side of the capsule base which faces the filling side. The production costs for the portion capsule are advantageously considerably reduced since the filter element is simply inserted only loosely into the portion capsule. The filter element is preferably fixed by the beverage substance which, when the portion capsule is filled, is arranged on the filter element and therefore firmly holds the filter element.

According to a further subject matter or a further embodiment of the present invention, provision is made for the diameter of the filter element to be greater than the diameter of the capsule base. When the portion capsule is filled with beverage substance, the filter element is advantageously pressed against the base region, with the protruding edge region necessarily fitting tightly against a side wall region of the portion capsule and projecting in the direction of the filling side or being bent in the direction of the filling side. This has the advantage that, when a central region of the filter element is lifted off from the base as a result of mechanical contact with the perforation means which enters the base region from the outside, the edge region slips down in the direction of the capsule base and in the direction of the central region, and therefore no beverage substance flows, in an unfiltered state, around the filter element in the direction of the outlet opening past the edge of the filter element. This makes it possible, in particular, for the filter element to be lifted off from the capsule base even in the case of a non-elastic filter element, without the filter effect being adversely affected. In the case of an elastic filter element, lifting off of the central region is at least assisted without adversely affecting the filter effect by the slipping edge region of the filter element since it is feasible to combine stretching and slipping of the filter element in the event of perforation of the capsule base too.

According to a further subject matter or a further embodiment of the present invention, provision is made for the filter element to have an edge region which projects substantially in the direction of the filling side and/or is bent in the direction of the filling side. In this way, it is likewise possible to achieve the above-described advantages according to which the edge region slips in the direction of the capsule base or in the direction of the central region as soon as the filter element is raised in the central region.

According to a further embodiment of the present invention, provision is made for the edge region to extend at least partially along a side wall region of the capsule body, with the side wall region extending between the filling side and the capsule base. The edge region is advantageously pressed against the side wall region by the beverage substance when the portion capsule is filled, as a result of which an improved sealing effect is achieved between the side wall region and the filter element. Particularly in the case of the above-described slipping of the filter element, this prevents brewing water flowing around the filter element without obstruction.

According to a further embodiment of the present invention, provision is made for the filter element to completely or only partially cover the capsule base. In particular, it is sufficient for the filter element to be arranged solely in the region of the perforation or in the region of an outlet opening in the capsule base.

According to a further embodiment of the present invention, provision is made for the filter element to be attached to the capsule base, with the filter element preferably being attached to the capsule base in a cohesive manner, in particular by sealing. This advantageously prevents the filter element from slipping. This attachment is preferably carried out by means of ultrasonic welding.

According to a further embodiment of the present invention, provision is made for the filter element to be attached to the capsule base in an edge region of the capsule base, and/or for the filter element to be attached to the side wall region in an edge region of the filter element. This advantageously prevents the filter element from slipping down and increases the sealing effect between the capsule body and the filter element, but with it further being made possible to lift off the filter element in its central region at the same time. In this case, the filter element is preferably elastic.

According to a further embodiment of the present invention, provision is made for the capsule base to have a protrusion in a direction opposing the filling side. The protrusion advantageously serves to accommodate the perforation means, so that when the perforation means punctures the capsule base, the capsule base is perforated in the region of the protrusion but the perforation means then remains in the cavity in the protrusion. This prevents perforation of the filter element. In particular, it is not necessary for the filter element to be lifted off by the perforation means in this embodiment.

Nevertheless, the filter element can be designed to be lifted off by the perforation means in order to preclude accidental perforation in any case.

According to a further subject matter or a further embodiment of the present invention, provision is made for the filter element to be formed in such a way that, when the capsule base is perforated by an external perforation means, the filter element is at least partially lifted off from the capsule base. This effectively prevents perforation of the filter element by the perforation means.

According to a further embodiment of the present invention, provision is made for the filter element to lift off from the capsule base only in a central region and to continue to rest on the capsule base or remain attached to the capsule base in the edge region of the capsule base. This advantageously prevents the filter element from slipping and increases the sealing effect between the capsule body and the filter element, but with it further being made possible to lift off the filter element in its central region at the same time. In this case, the filter element is preferably elastic.

According to a further subject matter or a further embodiment of the present invention, provision is made for the filter element to be formed in such a way that, when the capsule base is perforated by an external perforation means, the filter element lifts off from the capsule base in the central region of said filter element and an edge region of the filter element, which edge region previously projected in the direction of the filling side, moves at least partially in the direction of the capsule base. In this way, it is possible to achieve the above-described advantages according to which the edge region slips in the direction of the capsule base or in the direction of the central region as soon as the filter non-woven is raised by the perforation means in the central region, and therefore no beverage substance flows, in an unfiltered state, past the edge of the filter element around the filter element in the direction of the outlet opening.

According to a further subject matter or a further embodiment of the present invention, provision is made for the filter element to have a material reservoir. A material reservoir advantageously makes it possible for the filter element to lift off from the capsule base in the central region of said filter element, even though the filter element, in its edge region, is connected firmly (in particular in a cohesive manner) to the capsule base and is substantially non-elastic. The material reservoir comprises, in particular, a corrugated or folded region in the filter element, said region being partially smoothed when the central region is lifted off from the capsule base by the perforation means. This ensures that, when the capsule base is perforated by an external perforation means, the filter element lifts off from the capsule base in the central region of said filter element and material of the filter element moves from the material reservoir in the direction of the central region, so that the surface of the filter element, which surface increases in size as a result of the lifting process, is compensated for by material from the material reservoir.

According to a further embodiment of the present invention, provision is made for the capsule base to have a predetermined breaking point which is intended to tear open as a result of mechanical contact with an external perforation means, with the predetermined breaking point preferably having a plurality of lines of weakness which are arranged in a star shape around a central point of the capsule base. The capsule base preferably has a reduced material thickness along the lines of weakness and/or is perforated along the lines of weakness. Perforation of the capsule base is advantageously assisted by implementing the predetermined breaking point. This also has the advantage that a less sharp perforation spike for perforating the capsule base can be used, and therefore the risk of damage to the filter element when the filter element is lifted off by the perforation spike is reduced. In particular, a blunt perforation means is now sufficient for perforating the capsule base.

According to a further embodiment, the capsule base permanently has an outlet opening which is preferably sealed off by a film or foil, with the film or foil particularly preferably having a pull-off tab for pulling off the film or foil by hand. Perforation of the capsule base by means of an external perforation means is advantageously unnecessary in this case. Before the portion capsule is inserted into the brewing chamber, the film or foil is simply pulled off the capsule base by means of the pull-off tab and the brewing process can be started. Combining a prefabricated and therefore comparatively large outlet opening with a filter element comprising non-woven, felt, in particular needle felt, foam or sponge material has the advantage that the beverage liquid does not flow out of the outlet opening under high pressure and therefore the formation of foam ("crema"), in particular when producing an americano or tea, is prevented.

A further subject matter of the present invention is a method for producing the capsule according to the invention, wherein the filter element is cut out of a fabric web and inserted into the capsule. The cut-out filter element is preferably transported at least a certain distance by the blade, in particular a concave blade, which cuts it out. The cut-out filter element is preferably transported further by a sonotrode, which is required for ultrasonic welding, and/or pressed against the capsule, in particular the base thereof.

A further subject matter of the present invention is a method for producing a beverage using a portion capsule, wherein the portion capsule is provided in a first method step, wherein the capsule base is perforated by means of an external perforation means in a second method step, and wherein the filter element is at least partially spaced apart from the capsule base in a third method step. In the third method step, the filter element is preferably raised from the capsule base by the perforation means in such a way that it is spaced apart from the perforated capsule base. In this case, the capsule base is perforated in the region of a central point, and therefore the filter element is simultaneously raised mainly in its central region, while it continues to preferably rest on the capsule base or remains attached to the capsule base in the edge region of said filter element. In this way, the sealing effect between the capsule body and the filter element is not adversely affected by the central region being raised.

According to a further embodiment of the present invention, provision is made for the filter element to be at least partially stretched when the central region is spaced apart from the capsule base. This makes it possible to attach the edge region of the filter element to the capsule base in a cohesive manner, it nevertheless being possible for the filter element to be lifted off from the capsule base in the central region. The advantages of a maximum sealing effect are combined with the advantages of the rising filter element as a result.

According to a further embodiment of the present invention, provision is made for an edge region of the filter element which projects in the direction of the filling side to move in the direction of the capsule base when the central region is spaced apart from the capsule base during the third method step. This prevents the beverage liquid moving, in an unfiltered state, in the direction of the outlet opening when the central region is raised from the capsule base.

According to a further embodiment of the present invention, provision is made, when the central region is spaced apart from the capsule base during the third method step, for material of the filter element to move out of the material reservoir in the direction of the capsule base, with, in particular, a corrugated or folded region of the filter element being at least partially smoothed. This likewise makes it possible for the edge region of the filter element to be attached to the capsule base in a cohesive manner, it nevertheless being possible for the filter element to be lifted off from the capsule base in the central region. The material reservoir preferably extends around the central region of the filter element.

A further subject matter of the present invention is the use of a portion capsule for producing a beverage, preferably for producing a coffee, cocoa, tea and/or milk beverage.

The statements made in relation to one subject matter of the present invention apply to the other subjects in equal measure, and vice versa.

Exemplary embodiments of the invention are illustrated in the figures and explained in greater detail in the following description. The figures are described merely by way of example and do not restrict the general concept of the invention. The description applies to all the subjects of the present invention in equal measure.

BRIEF DESCRIPTION OF THE FIGURES

In the various figures, identical parts are always provided with the same reference symbols and therefore also will be generally cited or mentioned only once in each case.

DETAILED DESCRIPTION

Figure 1:
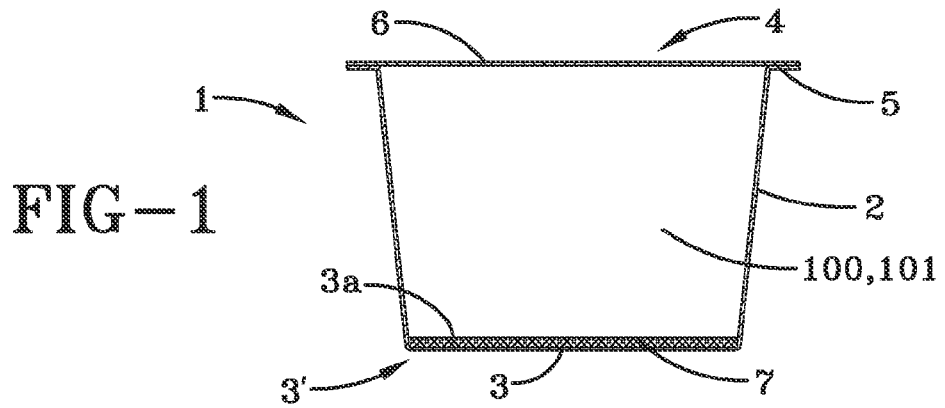
FIG. 1 shows a longitudinal section through a portion capsule according to a first embodiment of the present invention, which portion capsule is designed for the purpose of preparing an espresso.

FIG. 1 illustrates a first embodiment of the portion capsule 1 according to the invention. The portion capsule 1 comprises a capsule body 2 in the form of a truncated cone, having a closed capsule base 3 and having a collar edge 5 which is arranged on the filling side 4 of said capsule body and to which a cover film or foil 6 is welded or adhesively bonded. Therefore, a cavity 100, which is preferably sealed off in an air- and aroma-tight manner, is formed between the capsule base 3 and the cover film or foil 6, said cavity being filled with a pulverulent or granular beverage substance 101. In this case, the beverage substance 101 comprises, for example, coffee, cocoa, tea and/or milk powder (or granules). A filter element 7 comprising a non-woven filter or a sponge or foam filter is arranged on the inner side 3a of closed capsule body base 3, that is to say within the cavity 100. The filter element 7 is situated either loosely on the inner side 3a of the capsule base 3 or is firmly, that is to say preferably cohesively, connected to the inner side 3a of the capsule body base 3. In the second variant, the filter element 7 is attached in a cohesive manner to the capsule base 3, in particular only in an edge region 3' of the capsule base 3. The non-woven preferably comprises a non-woven material which is produced from fine polyester fibers. The fibers are particularly preferably thermally connected to one another by means of a calendar, for example a large number of extruded polyester fibers are arranged one on the other and next to one another and then consolidated (flat-calendered) by means of heated rollers. The non-woven material comprises random fiber and/or fiber-oriented non-woven material. The non-woven preferably has a mass per unit area (also called the grammage or the basis weight) of between 40 and 100 grams per square meter, particularly preferably of between 60 and grams per square meter, and very particularly preferably of substantially 70 grams per square meter. The filter element or the non-woven preferably has a thickness of between 0.20 and 0.8 millimeters, particularly preferably of between 0.25 and 0.39 millimeters, and very particularly preferably of substantially 0.32 millimeters. The non-woven is formed in such a way that air permeability of the non-woven is preferably between 1000 and 3000 $l/(m^2 s)$, particularly preferably between 1500 and 2500 $l/(m^2 s)$, and very particularly preferably substantially 2000 $l/(m^2 s)$, at a pressure of 100 pascal. The non-woven is further preferably formed in such a way that the breaking strength is substantially 110 newtons per 5 centimeters in the longitudinal direction and substantially 67 newtons per 5 centimeters in the transverse direction, with the breaking extension being substantially 30 percent in the longitudinal direction and substantially 38 percent in the transverse direction.

Figure 2:
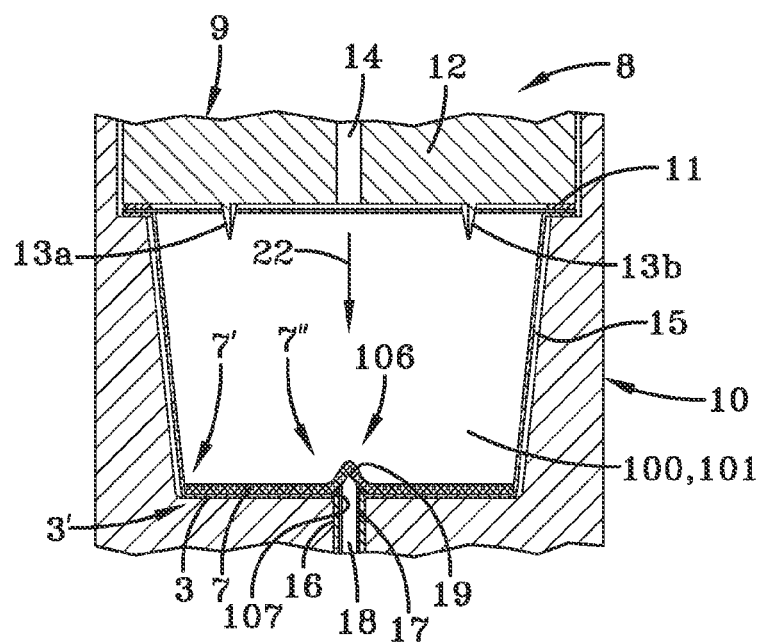
FIG. 2 shows a longitudinal section through a portion capsule, which is situated in a closed brewing chamber, according to the first embodiment of the present invention.

FIG. 2 illustrates a portion capsule 1 according to the first embodiment, which is illustrated in FIG. 1, of the present invention, with the portion capsule 1 in FIG. 2 being arranged in a closed brewing chamber 8. The brewing chamber 8 consists of a first brewing chamber element 9 and a second brewing chamber element 10, with the first brewing chamber element 9 being provided for the purpose of inserting the portion capsule 1 such that it can move in relation to the second brewing chamber element 10, or vice versa. A seal 11 is arranged between the two brewing chamber elements 9, 10. The first brewing chamber element 9 substantially consists of a closing piston 12 with puncturing elements 13a, 13b for opening the cover film or foil 6 of the portion capsule 1, a preparation liquid supply means 14 and the seal 11. The second brewing chamber element 10 substantially consists of a brewing chamber bell 15 which partially surrounds the portion capsule 1 and has an opening mandrel 16 which is arranged on the base of the brewing chamber bell 15 and is provided with discharge grooves 17, and a beverage discharge means 18. For the purpose of accommodating the portion capsule 1, the brewing chamber 8 is in an open state (not illustrated), in which the first and the second brewing chamber element 9, 10 are spaced apart from one another in order to ensure supply of the portion capsule 1, and in the illustrated closed state, in which a preparation process for producing a beverage using the portion capsule 1 can be carried out. In the closed state, the brewing chamber 8 is sealed off in a pressure-tight manner. When the brewing chamber 8 is moved from the open state to the depicted closed state, the cover film or foil 6 is pierced by the puncturing elements 13a, 13b, so that preparation liquid, in particular hot brewing water, passes through the preparation liquid supply means 14 under pressure and into the cavity 100 in the portion capsule 1. Furthermore, when the brewing chamber 8 is closed, the capsule base 3 is perforated by the perforation means, which is in the form of an opening mandrel 16, and therefore an outlet opening 107 is produced in the portion capsule 1, it being possible for the produced beverage liquid to leave the portion capsule 1 in the direction of the beverage discharge means 18 through said outlet opening. In order to assist delivery of the beverage liquid, the opening mandrel 16 is provided with the discharge grooves 17 on its casing surface. In the illustration, the base 3 of the portion capsule 1, which is located in the brewing chamber 9, 10, is pierced by the opening mandrel 16 of the second brewing chamber element, but the filter element 7, which is situated above the puncturing point, is slightly raised by the puncturing spike 19 of the opening mandrel 16 but not pierced. This is achieved, in particular, by the central region 7" not being cohesively connected to the capsule base 3 but the filter element 7 being cohesively connected to the capsule base 3 only in the edge region 3' of the capsule base 3, so that it is raised only from the capsule base 3 as a result of the mechanical contact with the spike of the opening mandrel 16 and therefore remains unperforated (that is to say is not perforated by the opening mandrel 16). The capsule base 3 and the filter element 7 remain in contact with one another and, in particular, cohesively connected to one another in the edge region 3' of the capsule base 3 and in the edge region 7' of the filter element 7, and therefore no beverage substance 101 enters the beverage discharge means 18 around the filter element 7. The capsule base 3 optionally has, at its central point 106 in which the capsule base 3 is perforated by the opening mandrel 16, a predetermined breaking point 104, and therefore a comparatively blunt opening mandrel 16 is sufficient for perforating the capsule base 3 and therefore the risk of the filter element 7 also being accidently perforated by the opening mandrel 16 is eliminated.

Figure 3:
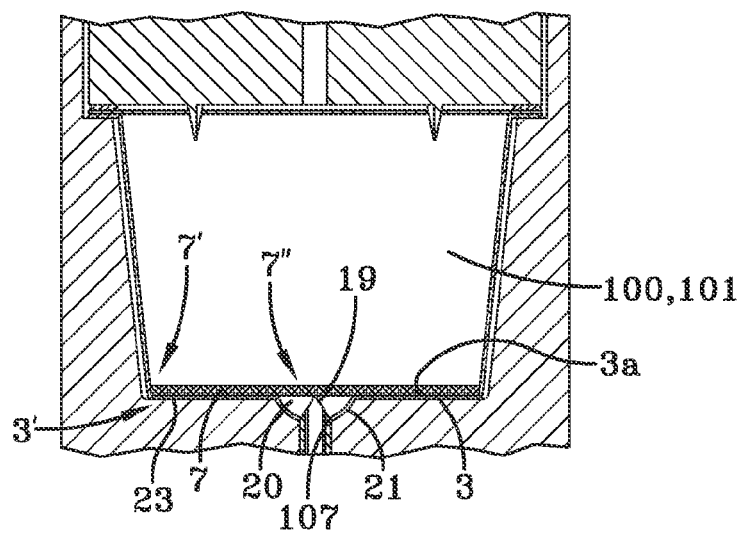
FIG. 3 shows a longitudinal section through a portion capsule, which is situated in a closed brewing chamber, according to a second exemplary embodiment of the present invention.

FIG. 3 illustrates a portion capsule 1 according to a second embodiment of the present invention, with the second embodiment substantially resembling the first embodiment, which is illustrated in FIG. 2, and likewise illustrating the portion capsule 1 in a closed brewing chamber 8. However, in contrast to the first embodiment, the portion capsule base 3 has, in the puncturing region of the opening mandrel 16, a protrusion 21 which is directed toward a recess 20 in the brewing chamber base 3a (the protrusion 21 is therefore directed in a direction which opposes the filling side 4) and which the opening mandrel 16 enters, without piercing the filter element 7 in the process. Therefore, it is, in particular, not necessary to lift off the filter element 7 from the capsule base 3. In order to produce the beverage, the brewing chamber 8 is closed again after the portion capsule 1 is inserted into the brewing chamber 8. During the closing process, the cover film or foil 6 of the portion capsule 1 is perforated by means of the puncturing means 13a, 13b and, after the first and the second brewing chamber element 9, 10 are brought together and sealed (by means of the seal 11), brewing water is made available via the liquid inlet 6. The opening mandrel 16 likewise makes an opening in the base 3 of the portion capsule 1 during the closing process of the brewing chamber. The thickness and the tear strength of the filter element 7, which is situated above the puncturing point, are matched to the penetration depth of the puncturing spike 19 of the opening mandrel 16, and therefore the filter element 7 is not pierced. As an alternative, the filter element 7 is situated above the protrusion 21 of the capsule base 3, which protrusion is situated in the recess in the brewing bell base 23, and the opening mandrel 16 enters only the protrusion 21 of the capsule base 3 and does not reach the filter element 7. The liquid, for example hot water when coffee is being produced, then flows into the capsule 1. In the capsule, this liquid flows through the beverage base 101 and extracts and/or dissolves the substances, which are required to produce the beverage, from the beverage base 101. The flow of the liquid in the beverage base 101 is illustrated by reference symbol 22. The resulting beverage then flows through the filter element 7 which is arranged between the beverage base 101 and the capsule base 3, this preventing constituents of the beverage base 101 entering the resulting beverage in particulate form and further entering a collection vessel, for example a cup or pot, via the opening made in the capsule base 3 by the opening mandrel 16 and via the discharge grooves 17 in the opening mandrel 16.

Figure 4A:
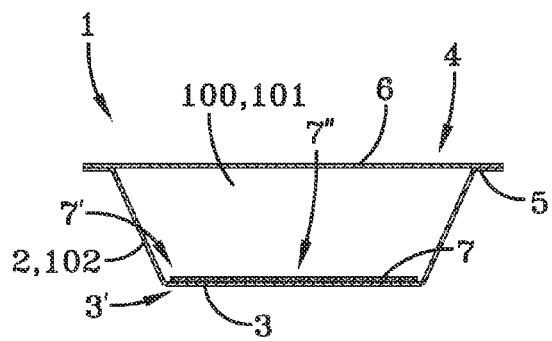
FIGS. 4a, 4b show schematic sectional views through a portion capsule according to a third embodiment of the present invention.
Figure 4B:
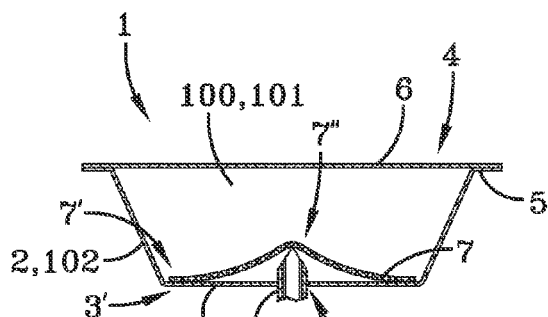

FIGS. 4a and 4b illustrate schematic sectional views through a portion capsule 1 according to a third embodiment of the present invention, the third embodiment substantially resembling the first embodiment, which is illustrated in FIGS. 1 and 2, with the filter element 7 being elastic. FIG. 4a illustrates the portion capsule 1 in its starting position, while FIG. 4b illustrates said portion capsule in a state in which it is perforated by the perforation means 16 (the portion capsule 1 is located in a brewing chamber 8 (not illustrated further) in FIG. 4b). When mechanical contact is made with the perforation means 16, the filter element 7 is, in its central region 7", stretched in the direction of the inlet side 4 on account of the elastic design of the filter element 7, without being perforated or torn by the perforation means 16. The filter element 7' remains firmly or cohesively connected to the capsule base 3 in the edge region of the capsule base 3', and therefore no beverage substance 101 passes from the cavity 100 in the direction of the outlet opening 107, which is produced by the perforation means 16, past the filter element 7.

Figure 5A:
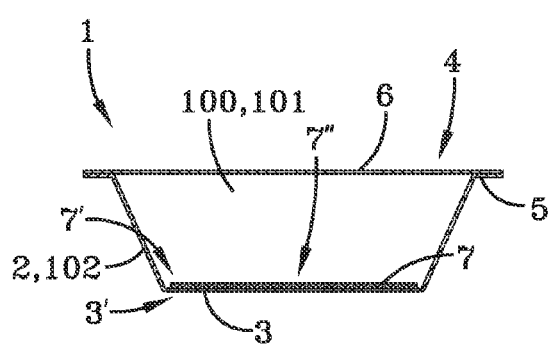
FIGS. 5a, 5b show schematic sectional views through a portion capsule according to a fourth embodiment of the present invention.
Figure 5B:
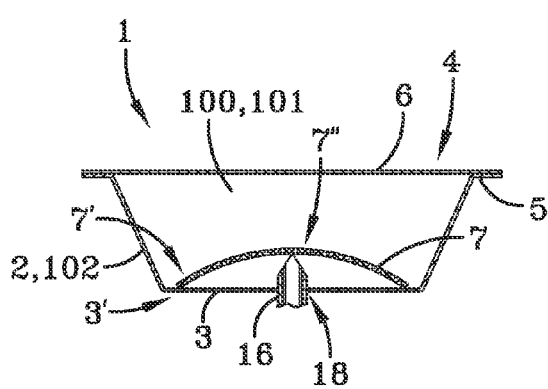

FIGS. 5a and 5b illustrate schematic sectional views through a portion capsule 1 according to a fourth embodiment of the present invention, with the fourth embodiment being substantially identical to the third embodiment, which is illustrated in FIGS. 4a and 4b. However, in this case, the filter element 7 is non-elastic and is raised virtually entirely from the capsule base 3 by the perforation means 16. Since the base area of the filter element 7 does not change in the process, the edge regions 7' of the filter element slide inward, that is to say in the direction of the central point 106 of the capsule base 3'.

Figure 6A:
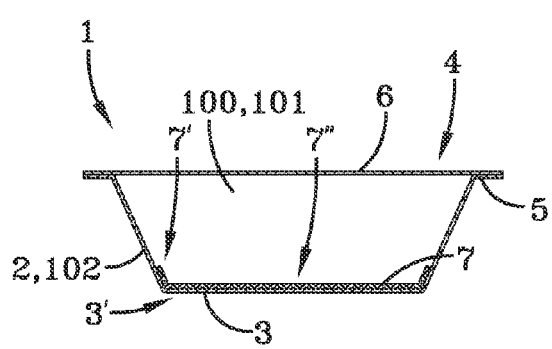
FIGS. 6a, 6b show schematic sectional views through a portion capsule according to a fifth embodiment of the present invention.
Figure 6B:
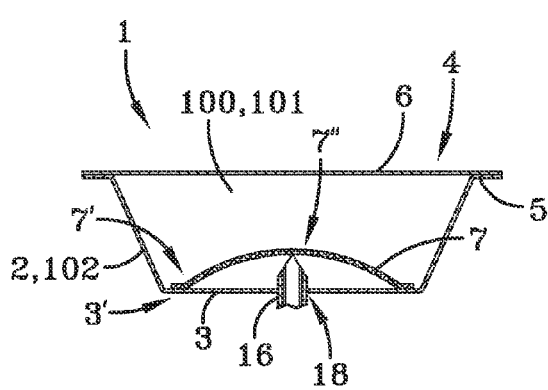

FIGS. 6a and 6b illustrate schematic sectional views through a portion capsule 1 according to a fifth embodiment of the present invention, with the fifth embodiment substantially resembling the sixth embodiment, which is illustrated in FIGS. 5a and 5b. The filter element 7 is, in particular, flexible and has a base area which is larger than the base area of the capsule base 3. This leads to the edge region 7' of the filter element 7 fitting tightly against a lower part of the side wall region 102 of the capsule body 2, which extends from the collar edge 5 to the capsule base 3, in the starting state of the portion capsule 1 as illustrated in FIG. 6a. If the capsule base 3 is now perforated by the perforation means 16 and the filter element 7 is raised, in its central region 7", from the capsule base 3 by the perforation means 16, the edge region 7' of the filter element 7 moves in the direction of the capsule base 3. This ensures that the edge region 3' of the capsule base 3 always remains covered by the filter element 7 and therefore no beverage substance 101 passes, in an unfiltered state, in the direction of the discharge means 18 past the filter element 7.

Figure 7A:
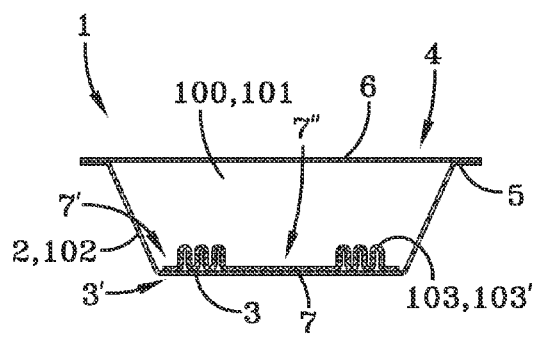
FIGS. 7a, 7b show schematic sectional views through a portion capsule according to a sixth embodiment of the present invention.
Figure 7B:
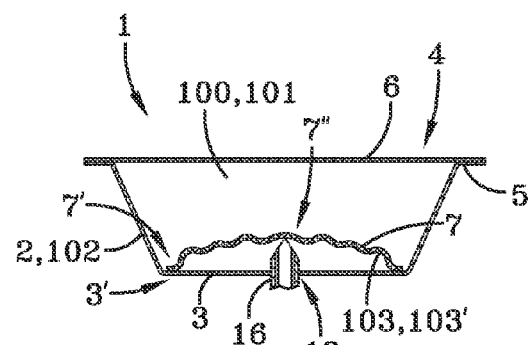

FIGS. 7a and 7b illustrate sectional views through a portion capsule 1 according to a sixth embodiment of the present invention. The sixth embodiment substantially resembles the fourth embodiment, which is illustrated in FIGS. 5a and 5b, with the filter element 7 having a material reservoir 103. The material reservoir 103 comprises a corrugated region 103', that is to say a region in which excess material of the filter element 7 is gathered. If the central region 7" is now raised from the capsule base 3 by the perforation means 16, traction forces act on the material reservoir 103, as a result of which the corrugated region 103' is at least partially smoothed and therefore sufficient material is available for the central region 7" to be raised to a sufficient extent and for tearing or perforation of the filter element 7 to be prevented.

Figure 8A:
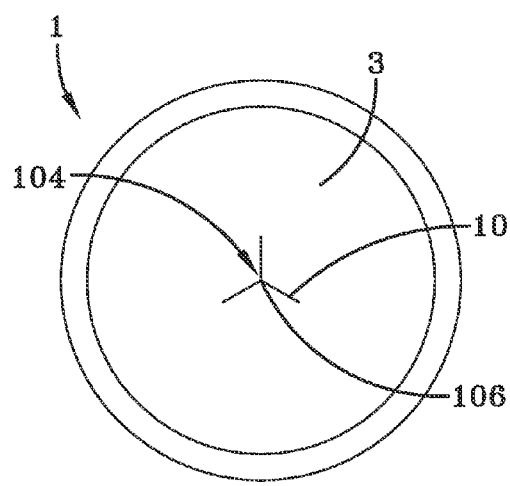
FIGS. 8a, 8b show schematic plan views of a capsule base of a portion capsule according to a seventh embodiment of the present invention.
Figure 8B:
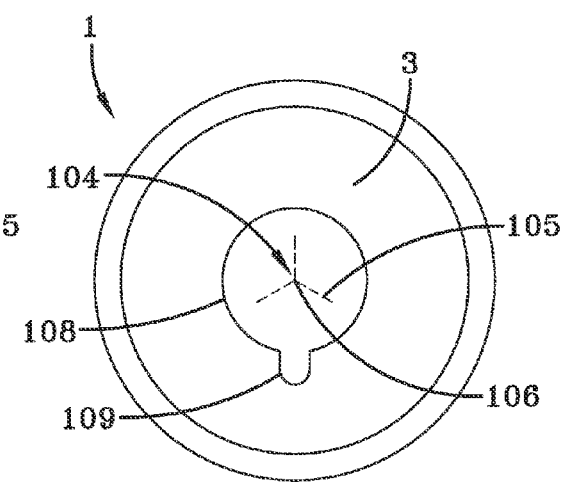

FIGS. 8a and 8b illustrate a view of a capsule base 3 of a portion capsule 1 according to a seventh embodiment of the present invention, said seventh embodiment substantially resembling the first embodiment, which is illustrated in FIGS. 1 and 2, with the portion capsule 1 being illustrated from "the bottom" in FIG. 8. This view shows the optional predetermined breaking point 104 which comprises three lines 105 of weakness which are arranged in the form of a star and in the radial direction around the central point 106 on the capsule base 3. The capsule base 3 has a reduced material thickness and/or the capsule base 3 is pre-perforated along the lines 105 of weakness in order to assist perforation in the brewing chamber 8. In order to retain the aroma of the beverage substance 101 even if the pre-perforated capsule base 3 is stored for a relatively long period of time, the capsule base 3 is preferably sealed with a film or foil 108, which can be perforated or pulled off by hand, at least in the region of the predetermined breaking point 104. The film or foil 108 sticks, for example, to the outer side of the capsule base 3 and is provided with a pull-off tab 109 which does not stick to the capsule base 3 and at which the film or foil 108 can be pulled off by hand. An exemplary embodiment with lines 105 of weakness in the form of perforations in the capsule base 3 and also with a film or foil 108 is illustrated in FIG. 8b.

Figure 9:
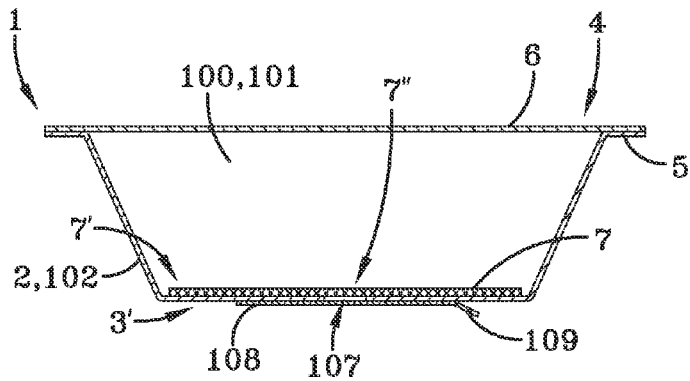
FIG. 9 shows a sectional view of a portion capsule according to an eighth embodiment of the present invention.

FIG. 9 illustrates a sectional view of a portion capsule 1 according to an eighth embodiment of the present invention. The eighth embodiment substantially resembles the first embodiment, which is illustrated in FIG. 1, with the portion capsules 1 of the eighth embodiment being equipped with a permanent outlet opening 107 in the capsule base 3, said outlet opening being sealed by the film or foil 108 in the starting state. Therefore, the portion capsule 1 does not have predetermined breaking points. In this case, the film or foil 108 likewise has the pull-off tab 109 for pulling off the film or foil 108 by hand. The capsule base 3 is not perforated by means of an external perforation means 16. Instead, before the portion capsule 1 is inserted into the brewing chamber 8, the film or foil 108 is simply pulled off from the capsule base 3 by means of the pull-off tab 109 and the brewing process can then be started directly and without perforation of the capsule base 3.

Figure 10:
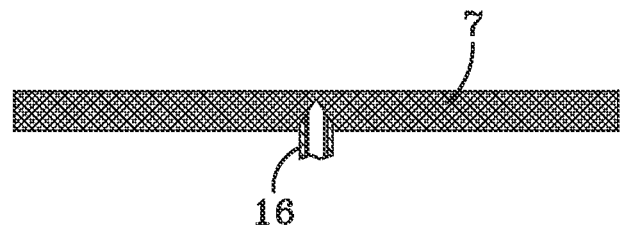
FIG. 10 shows a perforation means which enters the filter element.
Figure 11:
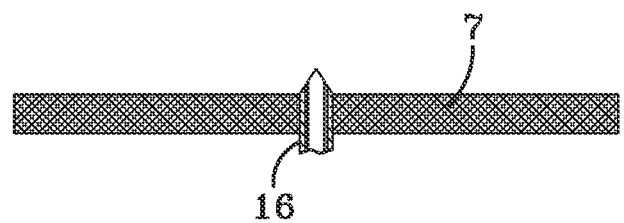
FIG. 11 shows a perforation means which penetrates the filter element.

FIGS. 10 and 11 show a further embodiment of the present invention. In the present case, the filter element 7 is designed such that the perforation means 16, when it penetrates the capsule, stretches, taps (FIG. 10) and/or pierces the filter element, that is to say the filter element is cohesively connected, for example, to the base of the capsule at least in sections, is intended to rest as far as possible over a large area of the base and/or is stretched.

Figure 12A:
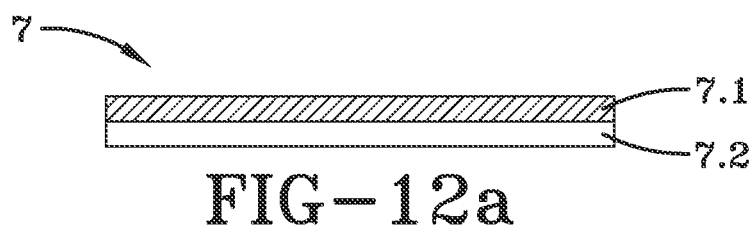
FIGS. 12a, 12b, 12c show different embodiments of the filter element comprising felt, in particular needle felt.
Figure 12B:
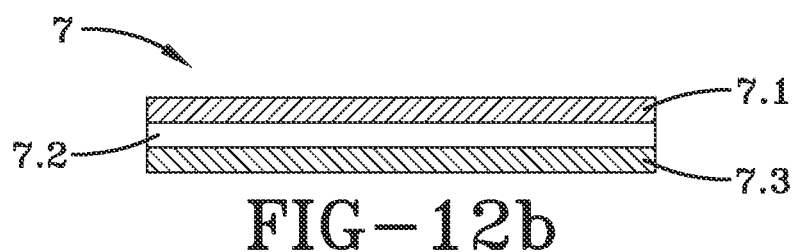
Figure 12C:

FIGS. 12a-c show different embodiments of a filter element 7 with a felt structure 7.1, in particular a needle felt structure. This filter element 7 preferably has a support structure 7.2, for example a woven structure. A felt structure 7.1 is arranged on and/or in this woven structure 7.2 over the entire surface which faces the coffee powder or tea, and for example connected to said woven structure by needle felting, as illustrated in FIG. 12a.

The embodiment according to FIG. 12b has two felt structures 7.1 and 7.3 which are each arranged on and/or in the support structure. The two structures preferably extend over the entire cross section, that is to say, in this case, the entire circular surface, of the filter element. The felt structures 7.1 and 7.3 can be of identical or different thickness. The felt structure 7.1 is preferably thinner than the layer 7.3, or vice versa. The support layer is thus offset in relation to the center, based on the thickness, of the filter element. The structures 7.1 and 7.3 can be produced from different materials or the same material. These relate not only to the substance from which they are produced but also the thread diameter and/or the thread length from which the felt structures are manufactured. A support structure 7.2 is provided between the two structures 7.1 and 7.3, said support structure not containing a felt structure or only a small felt structure and preferably permitting transverse flow.

FIG. 12c shows yet another embodiment of a filter element with a felt structure. In the present case, two filter elements 7 with a felt structure are arranged one above the other, as has been described, for example, according to FIGS. 12a and b. The filter elements 7 can only lie one on the other or be connected to one another. However, the filter elements 7 can also comprise only felt, without a support structure.

All the filter elements with a felt structure have the advantage that they exhibit a low level of pressure loss and that the pressure falls along the filter element with a shallow gradient. As a result, coffee without crema, that is to say foam, or tea without foam can be produced for example. The filter elements with a felt structure are preferably inserted only into the capsule. The filter element with the felt structure preferably has a larger diameter than the base of the capsule, and therefore it presses against the wall of the capsule in the edge region.

The filter element with a felt structure is preferably produced from PET, in particular completely.

LIST OF REFERENCE SYMBOLS

1 Portion capsule
2 Capsule body
3 Capsule base
3a Inner side of the capsule base
3' Edge region of the capsule base
4 Filling side
5 Collar edge
6 Cover film or foil
7 Filter element
7' Edge region of the filter element
7" Central region of the filter element
7.1 Felt structure, needle felt structure
7.2 Support structure
7.3 Felt structure, needle felt structure
8 Brewing chamber
9 First brewing chamber element
10 Second brewing chamber element
11 Seal 12 Closing piston
13a Puncturing element
13b Puncturing element
14 Preparation liquid supply means
15 Brewing bell
16 Opening mandrel
17 Discharge grooves
18 Discharge means
19 Puncturing spike
20 Recess
21 Protrusion
22 Preparation liquid flow
23 Brewing bell base
100 Cavity
101 Beverage base
102 Side wall region
103 Material reservoir
103' Corrugated or folded region
104 Predetermined breaking point
105 Lines of weakness
106 Central point
107 Outlet opening
108 Film or foil
109 Pull-off tab

The invention claimed is:

1. A portion capsule for producing a beverage, having a capsule body with a capsule base and a cover, with a cavity for accommodating a pulverulent or liquid beverage base being formed between the capsule base and the cover, and with a filter element being arranged between the beverage base and the capsule base, wherein the filter element comprises a non-woven which is arranged on an inner side of the capsule base, the non-woven comprising a felt structure such that no crema is formed on the beverage, and the felt structure comprising a plastic fiber material.

2. The portion capsule as claimed in claim 1, wherein the plastic fiber material comprises fine polyester fibers, wherein the non-woven has a mass per unit area of between 40 and 100 grams per square meter, wherein the non-woven has a thickness of between 0.20 and 0.8 millimeters, and wherein the non-woven has an air permeability of between 1000 and 3000 l/(m²s) at a pressure of 100 pascal.

3. The portion capsule as claimed in claim 1, wherein the felt structure is provided on or in a support structure.

4. A portion capsule for producing a beverage, having a capsule body with a capsule base and a cover, with a cavity for accommodating a pulverulent or liquid beverage base being formed between the capsule base and the cover, and with a filter element being arranged between the beverage base and the capsule base, wherein the filter element comprises a non-woven which is arranged on an inner side of the capsule base, the non-woven comprising a felt structure, the felt structure comprising a plastic fiber material, the felt structure is provided on or in a support structure, and wherein the filter element has two felt structures which are separated from one another by the support structure.

5. A portion capsule for producing a beverage, having a capsule body with a capsule base and a cover, with a cavity for accommodating a pulverulent or liquid beverage base being formed between the capsule base and the cover, and with a filter element being arranged between the beverage base and the capsule base, wherein the filter element comprises a non-woven which is arranged on an inner side of the capsule base, the non-woven comprising a felt structure, the felt structure comprising a plastic fiber material, and wherein the filter element is elastic and at least an edge of the filter element is arranged on the inner side of the capsule base.

6. The portion capsule as claimed in claim 1, wherein the filter element is ultrasonically sealed and stretched at the capsule base.

7. The portion capsule as claimed in claim 1, wherein the inner side of the capsule base faces the cover.

8. A portion capsule for producing a beverage, having a capsule body with a capsule base and a cover, with a cavity for accommodating a pulverulent or liquid beverage base being formed between the capsule base and the cover, and with a filter element being arranged between the beverage base and the capsule base, wherein the filter element comprises a non-woven which is arranged on an inner side of the capsule base, the non-woven comprising a felt structure, the felt structure comprising a plastic fiber material, and wherein the diameter of the filter element is greater than the diameter of the capsule base.

9. A portion capsule for producing a beverage, having a capsule body with a capsule base and a cover, with a cavity for accommodating a pulverulent or liquid beverage base being formed between the capsule base and the cover, and with a filter element being arranged between the beverage base and the capsule base, wherein the filter element comprises a non-woven which is arranged on an inner side of the capsule base, the non-woven comprising a felt structure, the felt structure comprising a plastic fiber material, and wherein the filter element has an edge which projects substantially in the direction of the cover and/or is bent in the direction of the cover.

10. The portion capsule as claimed in claim 9, wherein the edge extends at least partially along a side wall of the capsule body, with the side wall extending between the cover and the capsule base.

11. The portion capsule as claimed in claim 1, wherein the filter element completely or only partially covers the capsule base.

12. The portion capsule as claimed in claim 1, wherein the filter element is attached to the capsule base in a cohesive manner.

13. The portion capsule as claimed in claim 1, wherein the filter element is attached to the capsule base at an edge of the capsule base adjacent a side wall of the capsule body, and/or wherein the filter element is attached to the side wall of the capsule body.

14. A portion capsule for producing a beverage, having a capsule body with a capsule base and a cover, with a cavity for accommodating a pulverulent or liquid beverage base being formed between the capsule base and the cover, and with a filter element being arranged between the beverage base and the capsule base, wherein the filter element comprises a non-woven which is arranged on an inner side of the capsule base, the non-woven comprising a felt structure, the felt structure comprising a plastic fiber material, and wherein the capsule base has a protrusion in a direction opposing the cover.

15. The portion capsule as claimed in claim 1, wherein the capsule base is formed in such a way that, when the capsule base is perforated by an external perforation means, the filter element remains unperforated.

16. A portion capsule for producing a beverage, having a capsule body with a capsule base and a cover, with a cavity for accommodating a pulverulent or liquid beverage base being formed between the capsule base and the cover, and with a filter element being arranged between the beverage base and the capsule base, wherein the filter element comprises a non-woven which is arranged on an inner side of the capsule base, the non-woven comprising a felt structure, the felt structure comprising a plastic fiber material, and wherein the filter element is formed in such a way that, when the capsule base is perforated by an external perforation means, the filter element is at least partially lifted off from the capsule base.

17. The portion capsule as claimed in claim 16, wherein the filter element lifts off from the capsule base only in a central region of the capsule base and continues to rest on the capsule base or remains attached to the capsule base at an edge of the capsule base.

18. The portion capsule as claimed in claim 10, wherein the filter element is formed in such a way that, when the capsule base is perforated by an external perforation means, the filter element lifts off from the capsule base in a central region of said filter element and the edge of the filter element moves at least partially in the direction of the capsule base.

19. The portion capsule as claimed in claim 1, wherein the filter element has a material reservoir.

20. A portion capsule for producing a beverage, having a capsule body with a capsule base and a cover, with a cavity for accommodating a pulverulent or liquid beverage base being formed between the capsule base and the cover, and with a filter element being arranged between the beverage base and the capsule base, wherein the filter element comprises a non-woven which is arranged on an inner side of the capsule base, the non-woven comprising a felt structure, the felt structure comprising a plastic fiber material, the filter element has a material reservoir, and wherein the filter element has a corrugated or folded region which functions as the material reservoir.

21. A portion capsule for producing a beverage, having a capsule body with a capsule base and a cover, with a cavity for accommodating a pulverulent or liquid beverage base being formed between the capsule base and the cover, and with a filter element being arranged between the beverage base and the capsule base, wherein the filter element comprises a non-woven which is arranged on an inner side of the capsule base, the non-woven comprising a felt structure, the felt structure comprising a plastic fiber material, the filter element has a material reservoir, and wherein the filter element is formed in such a way that, when the capsule base is perforated by an external perforation means, the filter element lifts off from the capsule base in a central region of said filter element and material of the filter element from the material reservoir moves in a direction of the central region.

22. The portion capsule as claimed in claim 1, wherein the filter element is formed and attached to the capsule base in such a way that, when the capsule base is perforated by an external perforation means, the filter element is tapped and/or pierced.

23. A portion capsule for producing a beverage, having a capsule body with a capsule base and a cover, with a cavity for accommodating a pulverulent or liquid beverage base being formed between the capsule base and the cover, and with a filter element being arranged between the beverage base and the capsule base, wherein the filter element comprises a non-woven which is arranged on an inner side of the capsule base, the non-woven comprising a felt structure, the felt structure comprising a plastic fiber material, and wherein the capsule base has a predetermined breaking point which is intended to tear open as a result of mechanical contact with an external perforation means.

24. The portion capsule as claimed in claim 23, wherein the predetermined breaking point has a plurality of lines of weakness which are arranged in a star shape around a central point of the capsule base, wherein the capsule base has a reduced material thickness and/or is perforated along the lines of weakness.

25. A portion capsule for producing a beverage, having a capsule body with a capsule base and a cover, with a cavity for accommodating a pulverulent or liquid beverage base being formed between the capsule base and the cover, and with a filter element being arranged between the beverage base and the capsule base, wherein the filter element comprises a non-woven which is arranged on an inner side of the capsule base, the non-woven comprising a felt structure, the felt structure comprising a plastic fiber material, and wherein the capsule base has an outlet opening which is sealed off by a film or foil, with the film or foil having a pull-off tab for pulling off the film or foil by hand.

26. A method for producing a portion capsule, wherein a filter element is cut out of a strip of non woven comprising a felt structure made from plastic fiber material by a blade and inserted into the capsule by the blade and there fitted and sealed to a base of the capsule and then a powder or a tea is filled onto the filter element and the capsule is then sealed off by a cover film or foil.

27. The portion capsule as claimed in claim 1 wherein the felt structure comprises a needle felt structure.

* * * * *